(12) United States Patent
Blanc (10) Patent No.: US 12,453,573 B2
(45) Date of Patent: Oct. 28, 2025

(54) JET-PRODUCING NOZZLE HEAD AND APPARATUS COMPRISING THE SAME

(71) Applicant: AAPA Holding Sàrl, Le Locle (CH)

(72) Inventor: Jean-Pierre Blanc, Le Locle (CH)

(73) Assignee: AAPA Holding Sàrl, Le Locle (CH)

( * ) Notice: Subject to any disclaimer, the term of this patent is extended or adjusted under 35 U.S.C. 154(b) by 326 days.

(21) Appl. No.: 18/014,605

(22) PCT Filed: Jul. 12, 2021

(86) PCT No.: PCT/IB2021/056238
§ 371 (c)(1),
(2) Date: Jan. 5, 2023

(87) PCT Pub. No.: WO2022/013709
PCT Pub. Date: Jan. 20, 2022

(65) Prior Publication Data
US 2023/0255658 A1     Aug. 17, 2023

(30) Foreign Application Priority Data

Jul. 15, 2020   (EP) .................................... 20185865

(51) Int. Cl.
*A61B 17/3203* (2006.01)
(52) U.S. Cl.
CPC ................. *A61B 17/3203* (2013.01)
(58) Field of Classification Search
None
See application file for complete search history.

(56) References Cited

U.S. PATENT DOCUMENTS

| 5,485,961 A | * | 1/1996 | Reitzig | ..................... B05B 1/14 |
| | | | | 239/246 |
| 5,542,486 A | * | 8/1996 | Curlett | ..................... E21B 7/18 |
| | | | | 175/67 |

(Continued)

FOREIGN PATENT DOCUMENTS

GB     1445488 A     8/1976
WO   2003096871 A2   11/2003

(Continued)

OTHER PUBLICATIONS

International Search Report; European Patent Office; International Application No. PCT/IB2021/056238; Oct. 5, 2021; 3 pages.

(Continued)

*Primary Examiner* — Paul R Durand
*Assistant Examiner* — Michael J. Melaragno
(74) *Attorney, Agent, or Firm* — Taft Stettinius & Hollister LLP (57) ABSTRACT

A nozzle head configured to produce at least two jets of pressurized fluid converging to a common convergence point, said the head including a casing housing at least two outlet ports that are each configured to produce a corresponding one of the jets of pressurized fluid. At least one of the outlet ports, and preferably each of the outlet ports, is formed on an adjustable positioning element housed within the casing and whose position can be adjusted to control an angle of the resulting jet of pressurized fluid, and thereby allow adjustment of a position of the convergence point.

19 Claims, 7 Drawing Sheets

(56) References Cited

U.S. PATENT DOCUMENTS

| | | | |
|---|---|---|---|
| 2003/0025001 A1* | 2/2003 | De Laforcade | B65D 83/30 239/333 |
| 2010/0189859 A1* | 7/2010 | Blanc | A47J 31/3638 99/289 R |
| 2012/0035607 A1* | 2/2012 | Karwei | A61M 5/30 606/46 |
| 2013/0139698 A1* | 6/2013 | Blanc | A47J 31/40 99/289 R |
| 2015/0335343 A1 | 11/2015 | Hunter et al. | |
| 2016/0166104 A1* | 6/2016 | Blanc | A47J 31/407 99/295 |
| 2018/0085140 A1 | 3/2018 | Benassi et al. | |
| 2018/0350448 A1 | 12/2018 | Su et al. | |
| 2019/0184523 A1* | 6/2019 | Hashish | C23C 4/16 |
| 2023/0255658 A1* | 8/2023 | Blanc | A61B 17/3203 606/167 |
| 2024/0382229 A1* | 11/2024 | Ding | A61B 17/32037 |

FOREIGN PATENT DOCUMENTS

| | | | |
|---|---|---|---|
| WO | 2015171754 A1 | 11/2015 | |
| WO | 2016156031 A1 | 10/2016 | |

OTHER PUBLICATIONS

Written Opinion of the International Searching Authority; European Patent Office; International Application No. PCT/IB2021/056238; Oct. 5, 2021; 6 pages.

* cited by examiner

JET-PRODUCING NOZZLE HEAD AND APPARATUS COMPRISING THE SAME

CROSS REFERENCE TO RELATED APPLICATIONS

This application is a U.S. national stage filing of International Patent Application No. PCT/IB2021/056238 filed Jul. 12, 2021, which claims priority to European Patent Application No. 20185865.1 filed Jul. 15, 2020, the contents of each application are hereby incorporated by reference in their entirety.

TECHNICAL FIELD

The present invention generally relates to a nozzle head configured to produce at least two jets of pressurized fluid converging to a common convergence point, the nozzle head comprising a casing housing at least two outlet ports each configured to produce a corresponding one of the jets of pressurized fluid. The invention also relates to an apparatus, such as but not limited to a surgical instrument, comprising such a nozzle head coupled to a source of pressurized fluid.

BACKGROUND OF THE INVENTION

British Patent No. GB 1 445 488 A discloses a surgical instrument for removal of tissue of the type comprising a nozzle head with circumferentially spaced outlet ports each configured to produce a pulsating high-velocity jet of pressurized fluid, the outlet ports being arranged in such a way that all jets converge to a common convergence point located forward of the nozzle head. This convergence point coincides with the location used to disintegrate tissue, which disintegrated tissue is entrained in the jet fluid and sucked into and withdrawn through a central suction conduit leading away from the nozzle head.

International (PCT) Publication No. WO 03/096871 A2 discloses yet another surgical instrument of the type comprising a nozzle head with two or more outlet ports each configured to produce a jet of pressurized fluid, the outlet ports being arranged in such a way that all jets converge to a common convergence point located forward of or next to the nozzle head. This convergence point likewise coincides with the location used to e.g. cut, dissect, or abrade tissue.

International (PCT) Publication No. WO 2015/171754 A1 discloses a debridement device comprising a controllable Lorentz-force electromagnetic actuator, a nozzle delivering at least one jet of debridement substance to a region of tissue, which jet is driven by the controllable Lorentz-force electromagnetic actuator, and a suction port for removing the debridement substance after delivery to the region of tissue. In one embodiment, the debridement device includes a hand piece with a pair of rotatable nozzle arms that project away from a casing of the hand piece, each nozzle arm terminating in an outlet port through which fluid is ejected. As a result, two jets of pressurized fluid are formed that are oriented in such a way as to converge to a common convergence point. In effect, the two nozzle arms are designed as separate nozzle heads that are not housed within a same casing, but rather attached to a same hand piece so as to generate two jets of pressurized fluid within a same fixed plane, leading to a rather bulky arrangement compromising compactness. Furthermore, adjustment of the position of the convergence point of the two jets of pressurized fluid is only possible within the same fixed plane, which requires very precise positioning of the two nozzle arms in the first place.

International (PCT) Publication No. WO 2016/156031 A1, the content of which is incorporated herein by reference in its entirety, discloses a surgical instrument comprising a nozzle head in accordance with the preamble of claim 1. This surgical instrument is referred to hereinafter as the "ScalJet® instrument", ScalJet® being a registered trademark of company SCALJET SAS (www.scaljet.com), and comprises a conduit which is connected to a pressurized liquid source and which terminates in two openings, each having a diameter of between 0.03 mm and less than 0.1 mm and being disposed such as to supply two liquid jets that converge to a common convergence point. This convergence point is located forward of the two openings at a distance comprised between 20 and 40 mm, while the spacing between the two openings is comprised between 2 and 6 mm. The liquid is delivered at a pressure of the order of 60 to 200 bar. A cutting zone is defined as the zone located upstream of the convergence point. At the point of convergence, the two jets meet to form a lamellar dissection zone that is used to dissect tissue. Downstream of the lamellar dissection zone, most of the energy of the jets is dissipated and therefore cannot cause any particular harm or damage to tissue.

The aforementioned surgical instruments, especially the ScalJet® instrument, provide a convenient solution to safely cut and/or dissect biological tissue using e.g. a sterile physiological saline solution as the processing fluid.

Key to proper operation of the aforementioned surgical instruments is the generation of converging jets that are accurately oriented to converge at the desired convergence point, which imposes very tight manufacturing tolerances and is therefore difficult to master and negatively impacts production costs.

A disadvantage of the aforementioned solutions, besides being complex and difficult to produce, resides in the fact that adjustment of the jets and of the convergence point, including adjustment of the position of the convergence point and of the dimensions of the relevant cutting and dissection zones, is not readily possible.

There is therefore a need to provide a solution that obviates the problems and limitations of the known solutions.

SUMMARY OF THE INVENTION

A general aim of the invention is to provide an improved nozzle head of the type configured to produce at least two jets of pressurized fluid converging to a common convergence point, the nozzle head comprising a casing housing at least two outlet ports each configured to produce a corresponding one of the jets of pressurized fluid.

More specifically, an aim of the present invention is to provide such a nozzle head that allows adjustment of a position of the point of convergence of the jets of pressurized fluid.

A further aim of the invention is to provide such a solution that allows adjustment of the position of the point of convergence of the jets of pressurized fluid independently of manufacturing tolerances.

Yet another aim of the invention is to provide such a solution that is of simple, yet robust construction.

These aims are achieved thanks to the solutions defined in the claims.

In accordance with the invention, there is provided a nozzle head the features of which are recited in claim 1, namely a nozzle head configured to produce at least two jets of pressurized fluid converging to a common convergence point, the nozzle head comprising a casing housing at least two outlet ports each configured to produce a corresponding one of the jets of pressurized fluid. According to the invention, at least one of the outlet ports is formed on an adjustable positioning element housed within the casing and whose position can be adjusted to control an angle of the resulting jet of pressurized fluid and thus allow adjustment of a position of the convergence point.

By way of preference, each outlet port is formed on a corresponding adjustable positioning element.

The adjustable positioning element may in particular comprise a bearing element exhibiting a substantially spherical outer surface. In this context, each bearing element is preferably received within a corresponding bore of a supporting member housed within the casing of the nozzle head, each bearing element being held by friction within this bore.

In the latter context, the nozzle head may in particular be designed to take a first, adjustable configuration, in which each bearing element can be moved with respect to the supporting member to perform adjustment of the angle of the jet of pressurized fluid, and a second, locked configuration, in which each bearing element is locked in place and cannot move with respect to the supporting member. By way of preference, the casing comprises first and second casing members. Furthermore, in the first, adjustable configuration, the first and second casing members are spaced one from the other to allow movement of each bearing element with respect to the supporting member and, in the second, locked configuration, the first and second casing members are pressed one onto the other or otherwise immobilized to prevent movement of each bearing element with respect to the supporting member.

In the latter context, each bearing element may in particular be located between a pair of washers located within the casing such that, in the second, locked configuration, the first and second casing members cause the pair of washers to press against each bearing element and prevent movement thereof with respect to the supporting member.

By way of preference, each outlet port comprises a nozzle element provided with an orifice configured to produce a corresponding one of the jets of pressurized fluid.

A diameter of each orifice may especially be comprised between 0.01 mm and 1.5 mm, leading to the production of a corresponding high-pressure micro-jet.

A distance between the common convergence point and each orifice (which distance is adjustable thanks to the invention) may especially be comprised between 10 mm and 120 mm.

By way of preference, each nozzle element consists of an orifice-forming element made of a hard material. The hard material may be sapphire, ruby or diamond, a hard metal such as steel, or a ceramic material, such as (but not limited to) tungsten carbide.

Advantageously, each nozzle element forms part of a corresponding adjustable positioning element and is received within a recess and supported by a shoulder portion thereof.

The invention also relates to an apparatus comprising a nozzle head in accordance with the present invention coupled to a source of pressurized fluid. In this context, each jet of pressurized fluid is preferably produced at a pressure exceeding 50 bar. A pressure of the order of 50 to 200 bar especially comes under consideration for surgical applications, but much higher pressures could be contemplated for other applications, such as for machining purposes.

The apparatus may in particular be a surgical instrument used for cutting and/or dissecting biological tissue, be it human, animal or vegetal tissue.

Further advantageous embodiments of the invention are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

The present invention will be described in relation to various illustrative embodiments. It shall be understood that the scope of the invention encompasses all combinations and sub-combinations of the features of the embodiments disclosed herein.

As described herein, when two or more parts or components are described as being connected, secured or coupled to one another, they can be so connected, secured or coupled directly to each other or through one or more intermediary parts.

The invention will be described in relation to various embodiments of a nozzle head as shown in FIGS. 1 to 6, which nozzle head is generally designated by reference numeral 1. This nozzle head 1 is especially intended to form part of a surgical instrument as used to carry out hydrosurgery on human or animal tissue. Such nozzle head 1 can in particular be incorporated into a surgical instrument as generally described in International (PCT) Publication No. WO 2016/156031 A1, the content of which is incorporated herein by reference in its entirety. FIG. 7 is an illustration of a ScalJet® instrument, designated by reference numeral 1000, which instrument 1000 is also shown in exploded view. As shown in FIG. 7, the nozzle head 1 can be provided at a terminal end of the instrument 1000 and be coupled to a source of pressurized fluid (not shown), such as a sterile physiological saline solution.

The nozzle head of the invention may however be used for a large variety of different applications, including for machining purposes, such as cutting of parts or surface treatment. The nozzle head of the invention may for instance form part of an industrial cutter, such as a water jet cutter, or as part of a surface treatment or ablation machine. In such case, the pressurized fluid may additionally contain an abrasive substance mixed with the relevant fluid to form an abrasive jet. Other applications could further be contemplated, such as the use of the nozzle head as part of a system to defuse or disarm explosive devices, using converging high-pressure jets of liquid to destroy or otherwise deactivate detonators.

In the example illustrated in FIGS. 1 to 7, the nozzle head 1 exhibits very small dimensions with a diameter smaller than 10 mm (e.g. of the order of 8 mm) and a thickness smaller than 5 mm (e.g. less than 4 mm) and is in effect designed to produce a pair of high-pressure micro-jets extending from two outlet ports 10A, 10B. All components constitutive of the nozzle head 1 are contained within a casing 11/12 comprising a pair of casing members 11, 12. The casing 11/12 is here of substantially cylindrical shape, but it will be appreciated that this shape is not particularly restrictive and that other shapes could be contemplated within the scope of the invention.

While the nozzle head 1 shown in the Figures comprises a pair of outlet ports 10A, 10B, it will be appreciated that the invention is applicable to any nozzle head comprising two or more outlet ports configured to produce a corresponding number of jets of pressurized fluid that are intended to converge to a common convergence point.

Figure 1:
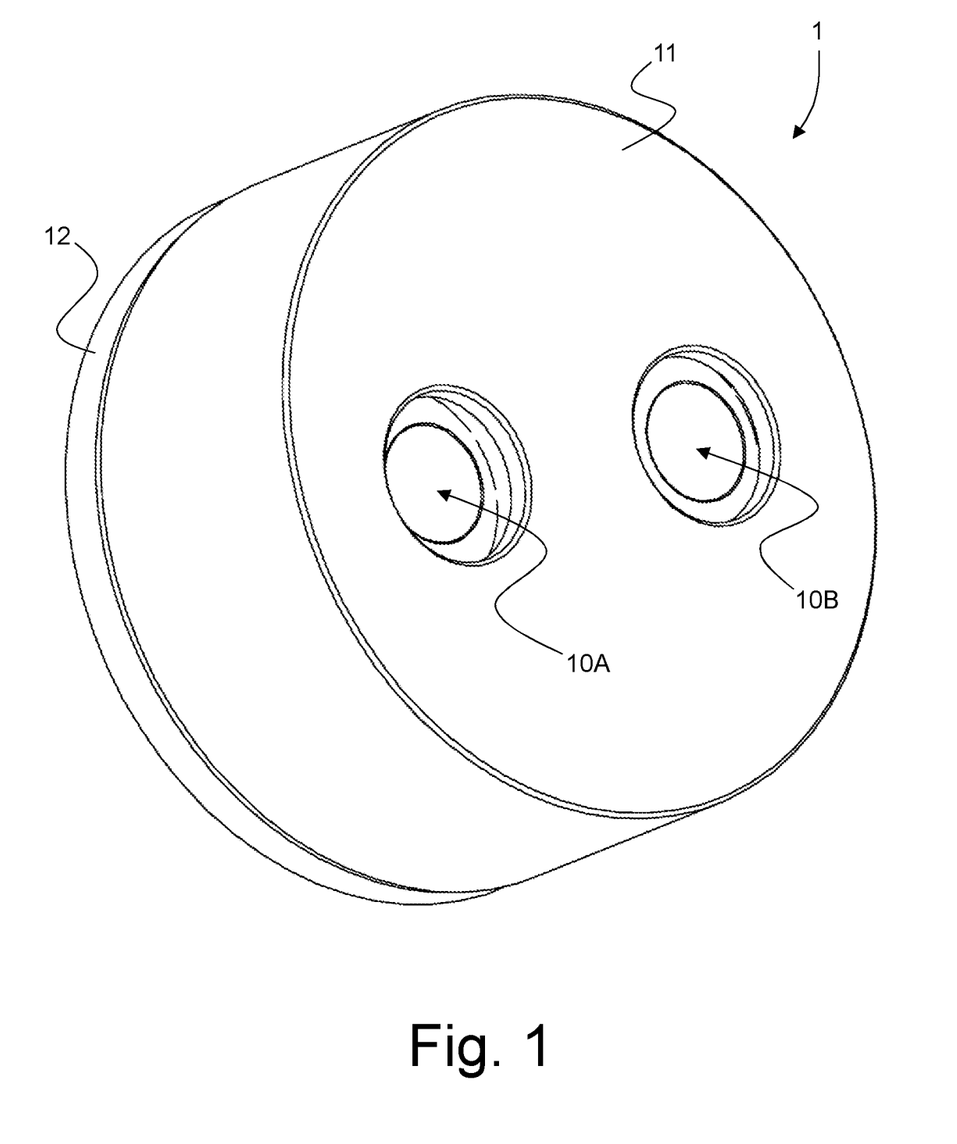
FIG. 1 is a schematic perspective view of a nozzle head with two outlet ports in accordance with an embodiment of the invention.
Figure 2:
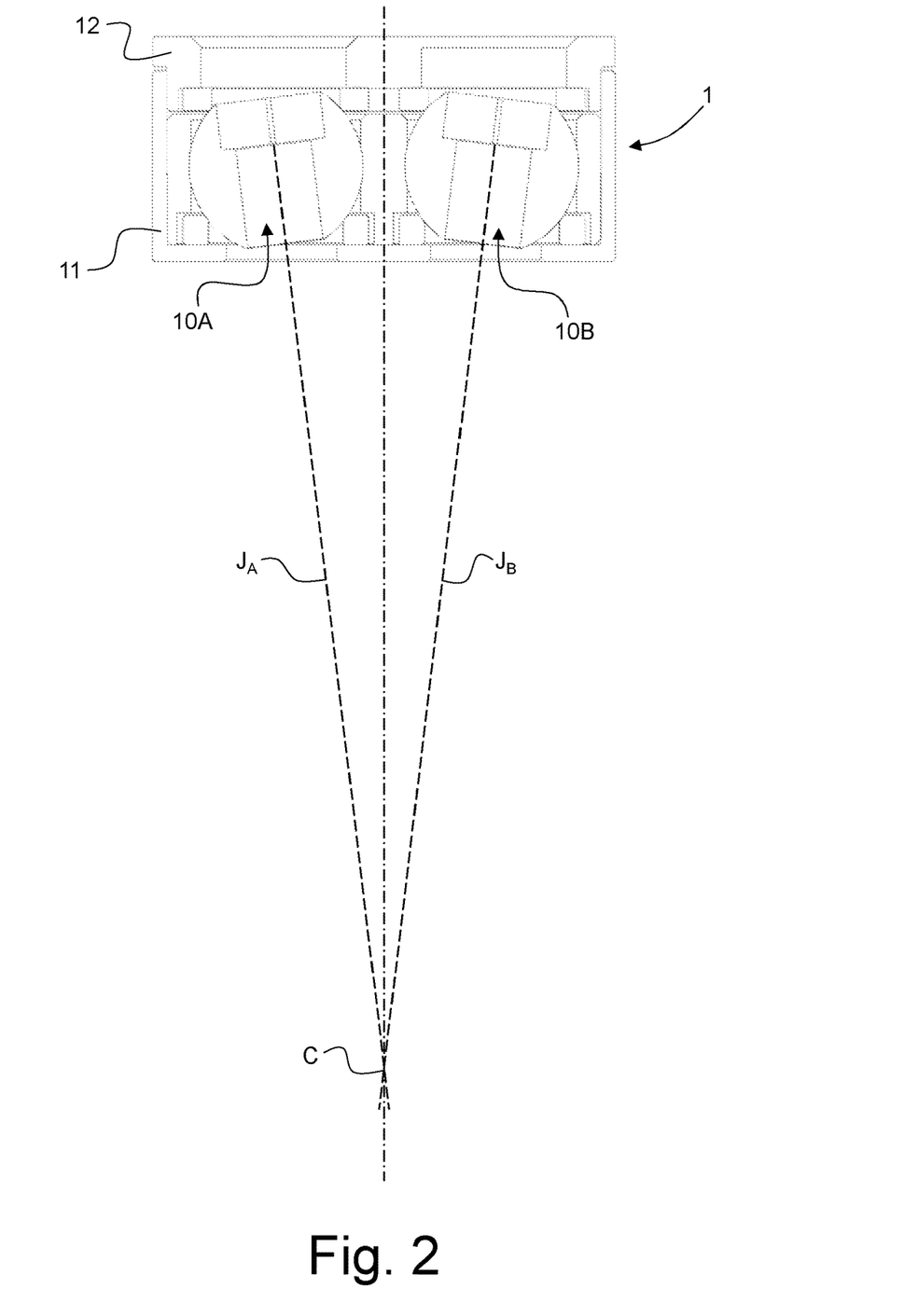
FIG. 2 is schematic cross-section of the nozzle head of FIG. 1 taken along a cross-sectional plane passing through the longitudinal axis of the two outlet ports and further showing a pair of jets of pressurized fluid produced by the nozzle head and converging to a common convergence point.

FIG. 2 is a schematic cross-section of the nozzle head 1 of FIG. 1 taken along a cross-sectional plane passing through the longitudinal axis of the two outlet ports 10A, 10B. FIG. 2 shows the nozzle head 1 in an adjusted configuration, with the outlet ports 10A, 10B being positioned to produce two converging jets $J_A$, $J_B$ that converge to a common convergence point C that is located along a central axis forward of the nozzle head 1. In the illustrated example, the distance between each orifice of the outlet ports 10A, 10B and the convergence point C is of the order of 30 mm, but it should be appreciated that such distance is adjustable thanks to the invention. By way of preference, in the context of the surgical application being contemplated, this distance is comprised between 10 mm and 50 mm, and the lateral spacing between the outlet ports 10A, 10B is of the order of 2 mm to 6 mm. By way of illustration, the two outlet ports 10A, 10B are spaced one from the other by a distance of approximately 3.7 mm. It will however be understood that these dimensions are purely illustrative of the relevant surgical application being considered, and that such dimensions could be varied depending on the contemplated application and the desired geometry of the nozzle head. According to the invention, the distance between the common convergence point and each orifice is preferably comprised between 10 mm and 120 mm, but distances exceeding 120 mm could potentially be contemplated.

Figure 3:
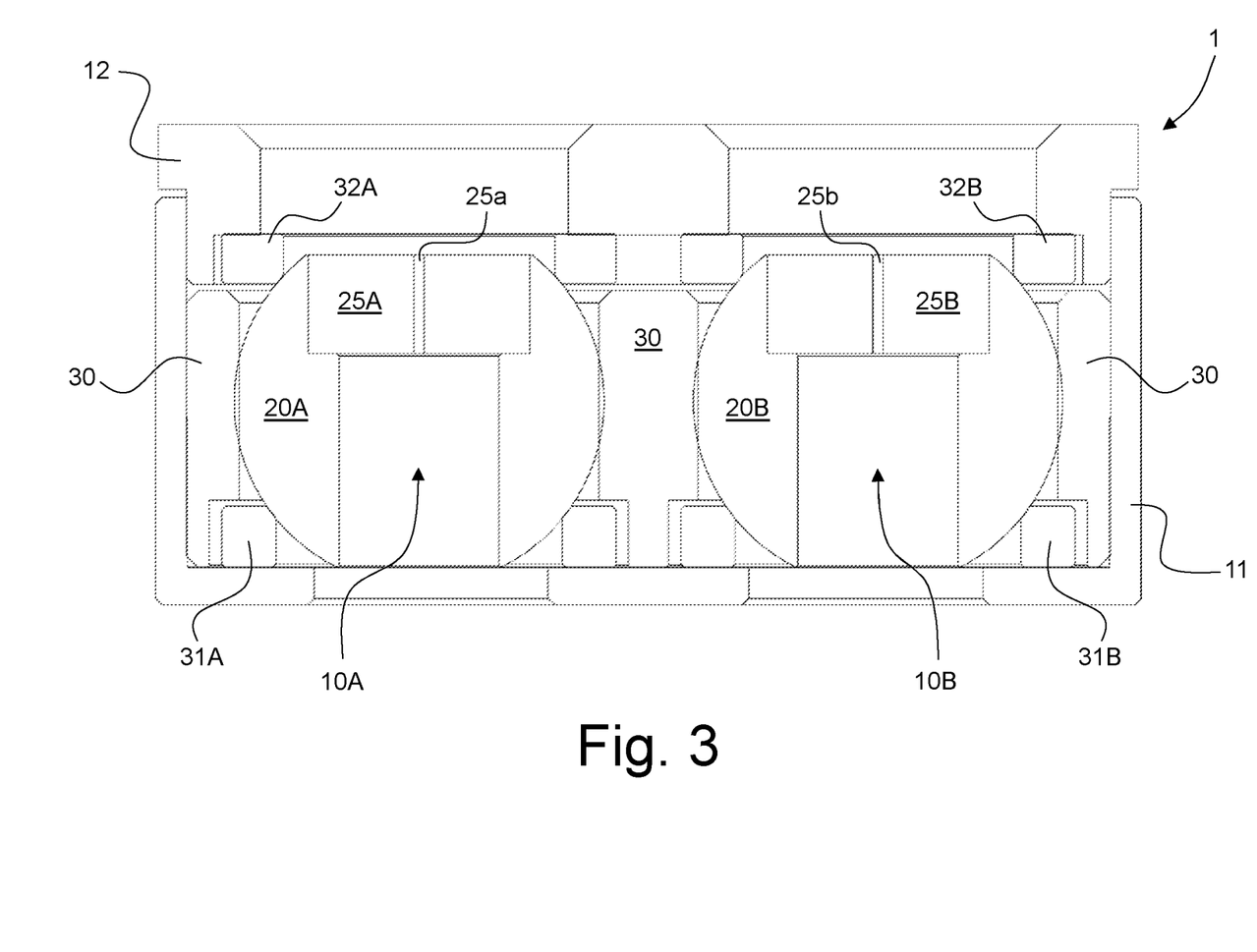
FIG. 3 is schematic cross-section of the nozzle head of FIG. 1 shown in a non-adjusted configuration.
Figure 4:
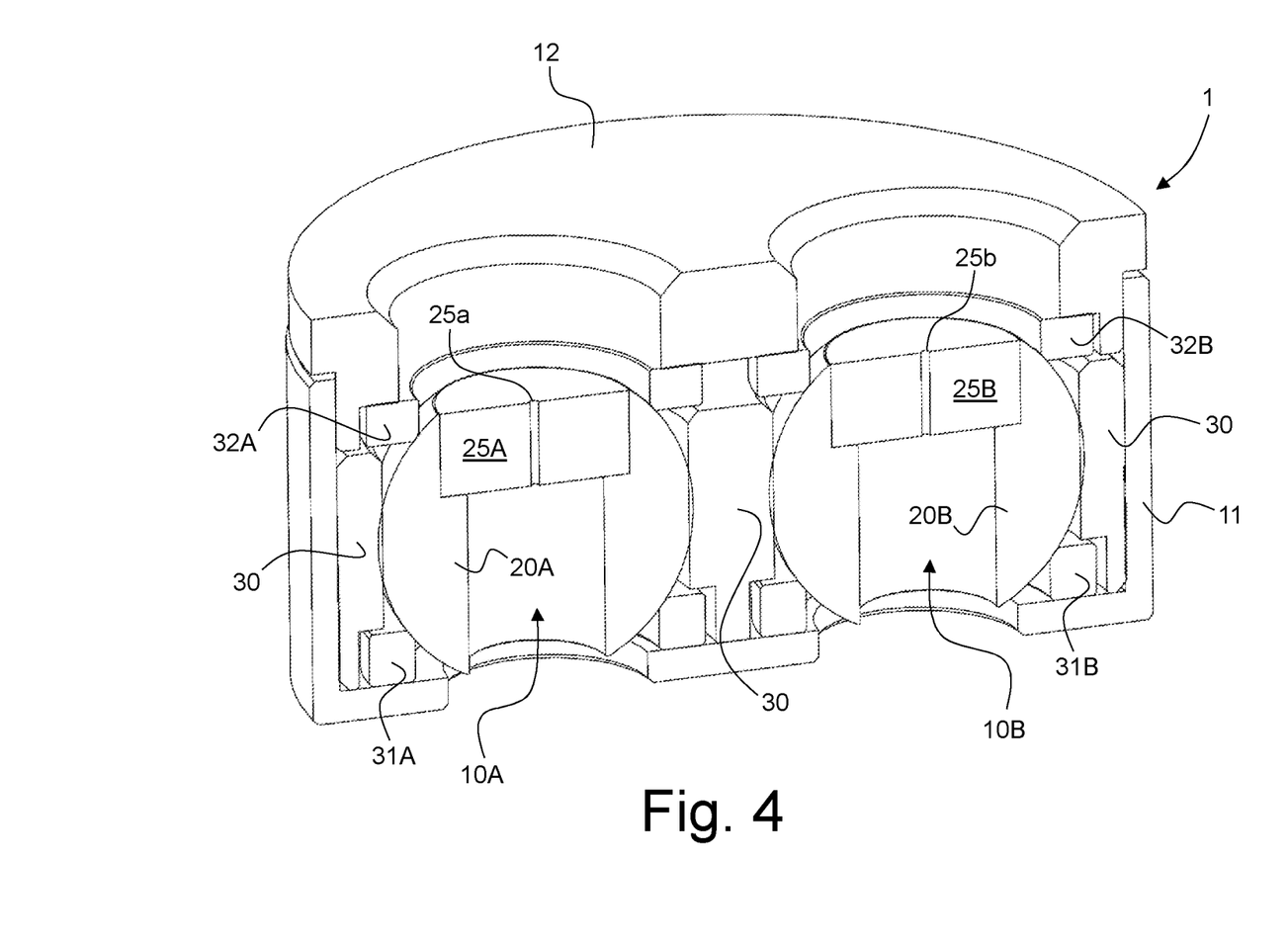
FIG. 4 is a perspective view of the cross-section shown in FIG. 3.
Figure 5:
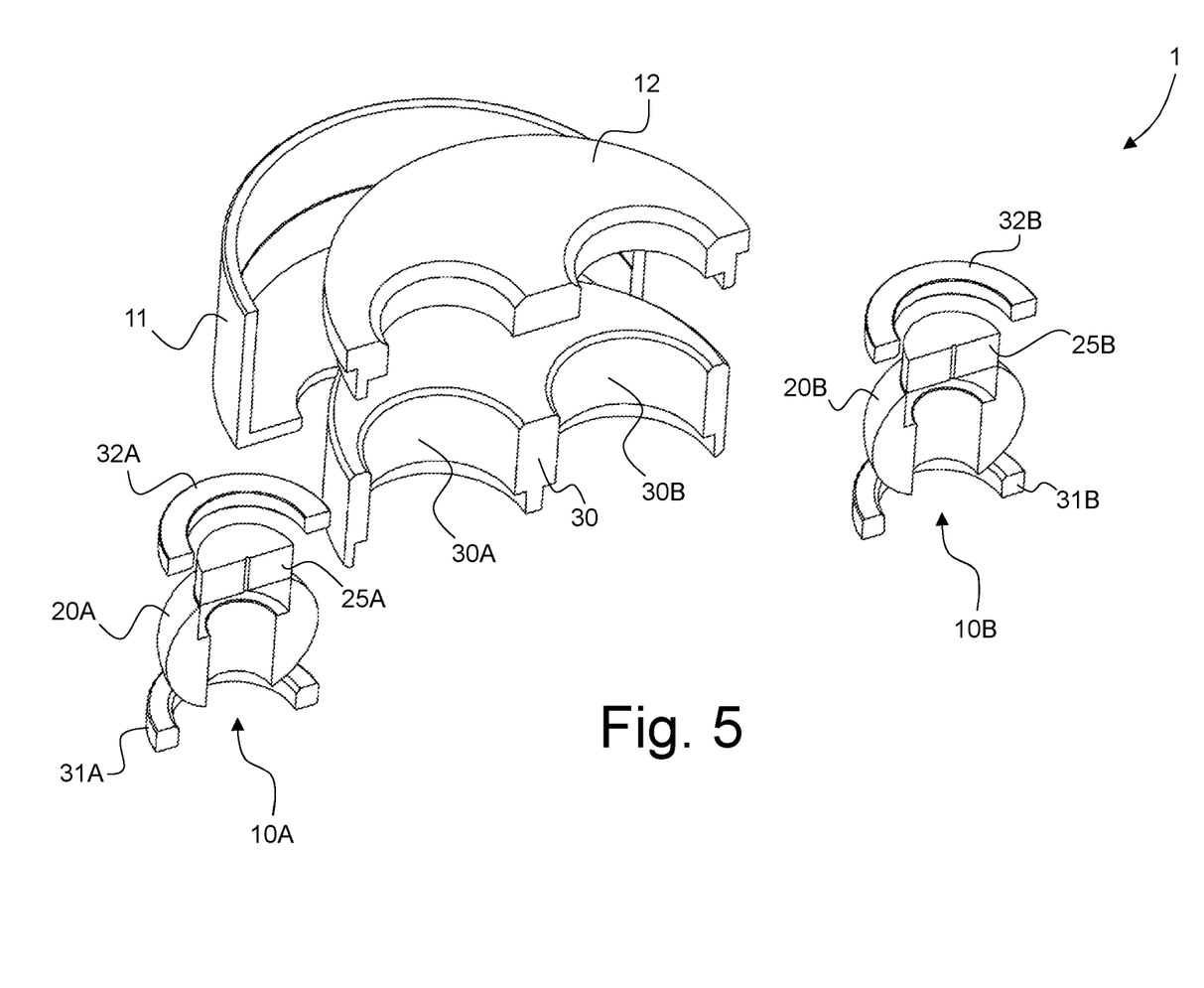
FIG. 5 is an exploded perspective view of the cross-section shown in FIG. 3.

FIG. 3 is a schematic cross-section of the nozzle head 1 of FIG. 1 shown in a non-adjusted configuration. FIGS. 4 and 5 respectively show a perspective view and an exploded perspective view of the cross-section shown in FIG. 3, half of the nozzle head 1 being omitted in FIGS. 4 and 5 for the purpose of explanation.

Figure 6:
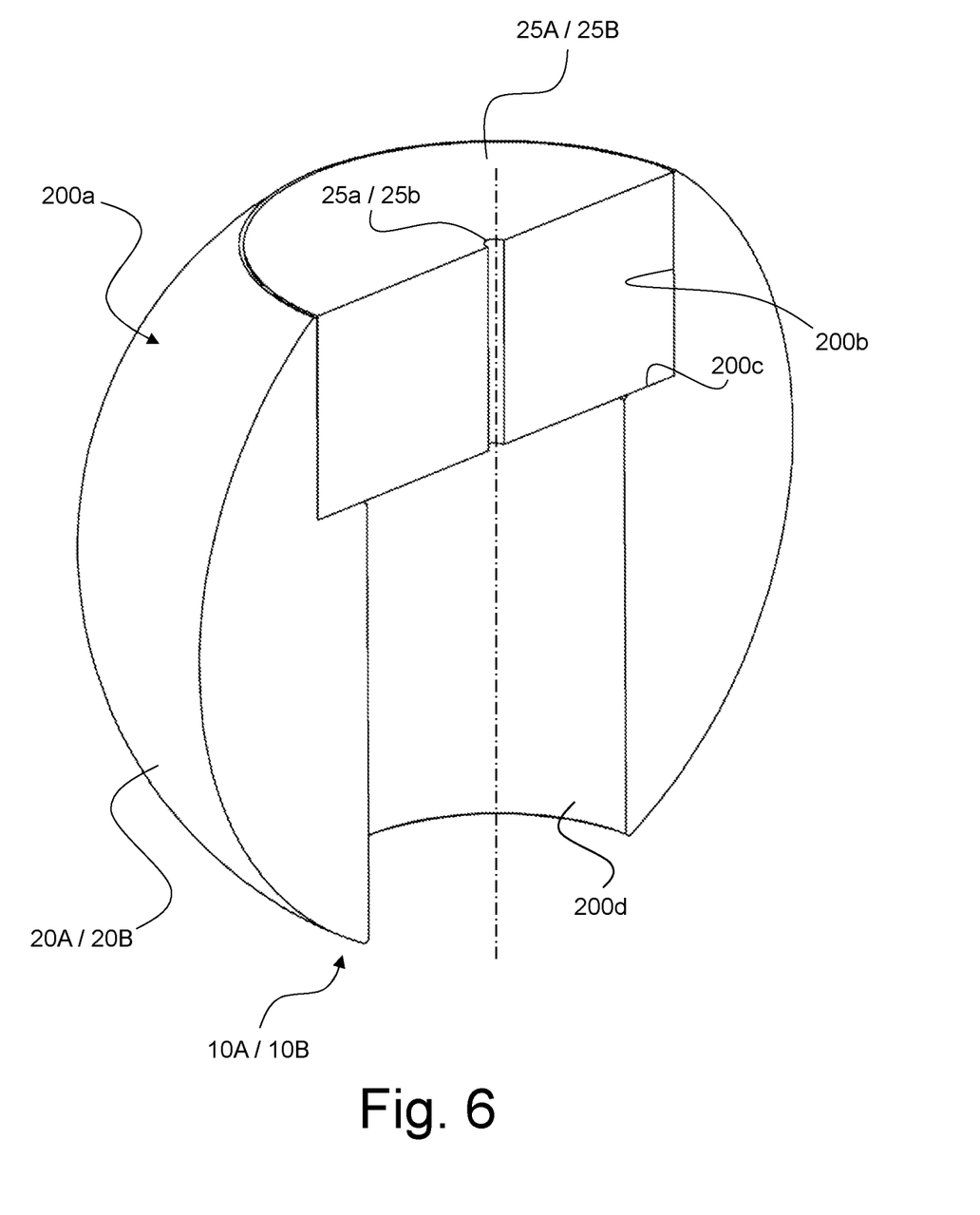
FIG. 6 is a perspective view of a cross-section of each outlet port of the nozzle head as shown in FIG. 4.
Figure 7:
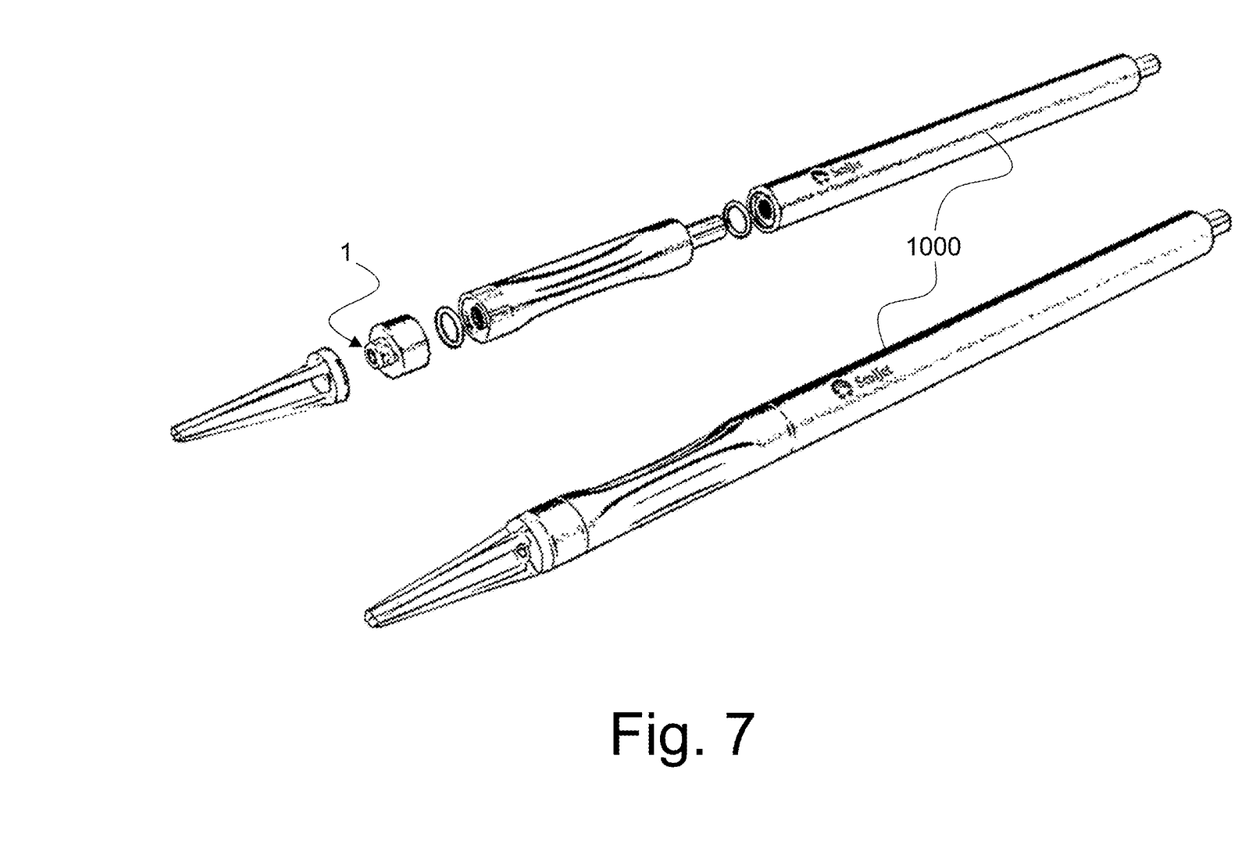
FIG. 7 is an illustration of a surgical instrument that can be equipped with the nozzle head of the invention, which surgical instrument is also shown in exploded view.

Housed within the casing 11/12 are the two outlet ports 10A, 10B, each outlet port 10A, 10B being formed on a corresponding adjustable positioning element 20A/25A, resp. 20B/25B, also illustrated in FIG. 6. The position of each adjustable positioning element 20A/25A, resp. 20B/25B, can be adjusted to control an angle of the resulting jet of pressurized fluid and thus allow adjustment of a position of the convergence point. In effect, the invention allows proper adjustment of the convergence of the jets produced by the outlet ports 10A, 10B, as well as adjustment of the position of the resulting point of convergence of the jets.

In the illustrated example, as this will become apparent, each adjustable positioning element 20A/25A, resp. 20B/25B, is preferably configured like a ball joint or spherical bearing that permits angular rotation of each outlet port 10A, 10B about a central point, with two degrees of freedom, thus providing substantial flexibility in the angular adjustment of each outlet port 10A, 10B.

As shown in FIGS. 3 to 6, each adjustable positioning element 20A/25A, resp. 20B/25B, includes a bearing element 20A, resp. 20B, exhibiting a substantially spherical outer surface 200a. Each bearing element 20A, resp. 20B here exhibits a recess 200b dimensioned to receive a corresponding nozzle element (or orifice-forming element) 25A, resp. 25B, which nozzle element 25A, 25B is supported by a shoulder portion 200c of the bearing element 20A, resp. 20B. Each nozzle element 25A, 25B is provided with an orifice 25a, resp. 25b, configured to produce a corresponding one of the jets of pressurized fluid. Reference 200d in FIG. 6 designates an outlet aperture formed in each bearing element 20A, 20B.

By way of preference, a diameter of each orifice 25a, 25b is comprised between 0.01 mm and 1.5 mm. In the illustrated example, the diameter of each orifice 25a, 25b is of 0.08 mm.

Each nozzle element 25A, 25B preferably consists of an orifice-forming element made of a hard material, such as sapphire. The orifice-forming element may alternatively be made of ruby or diamond, of a hard metal, such a steel, or of a ceramic material, such as but not limited to tungsten carbide.

By way of preference, each bearing element 20A, 20B is received within a corresponding bore 30A, resp. 30B, of a supporting member 30 that is likewise housed within the casing 11/12, each bearing element 20A, 20B being held by friction within the relevant bore 30A, 30B. The supporting member 30 thus holds both bearing elements 20A, 20B in position, while allowing each bearing element 20A, 20B to be selectively moved with respect to the supporting member 30 to perform adjustment operations.

Even more preferably, the nozzle head 1 is designed to take a first, adjustable configuration, in which each bearing element 20A, 20B can be moved with respect to the supporting member 30 to perform adjustment of the angle of the jet of pressurized fluid, and a second, locked configuration, in which each bearing element 20A, 20B is locked in place and cannot move with respect to the supporting member 30. In the illustrated example, this is achieved by designing the first and second casing members 11, 12 to be spaced one from the other, in the first, adjustable configuration, to allow movement of each bearing element 20A, 20B with respect to the supporting member 30. In the second, locked configuration, the first and second casing members 11, 12 are pressed one onto the other (or otherwise immobilized) to prevent movement of each bearing element 20A, 20B with respect to the supporting member 30.

More specifically, in the illustrated example, each bearing element 20A, 20B is located between a pair of washers 31A, 32A, resp. 31B, 32B, also located within the casing 11/12. Pressing of the first and second casing members 11, 12 one against the other causes each pair of washers 31A, 32A, resp. 31B, 32B, to press against each bearing element 20A, 20B and prevent movement thereof with respect to the supporting member 30. As a result, the supporting member 30 is compressed within the casing 11/12, thereby also contributing to preventing movement of the bearing elements 20A, 20B.

Any suitable locking arrangement ensuring that the nozzle head 1 takes and remains in a locked configuration could be contemplated. For instance, the first and second casing members 11, 12 could be screwed one on the other, or glued or welded one onto the other to ensure immobilization of the bearing elements 20A, 20B.

The aforementioned supporting member 30 may be made of polyoxymethylene (also referred to by the acronym "POM"), such as Delrin® from DuPont, or any other adequate material, for example polyether ether ketone (also referred to by the acronym "PEEK") which is a biocompatible polymer material usable for medical applications. The casing 11/12, bearing elements 20A, 20B and washers 31A, 31B, 32A, 32B may be made of a medical grade metal such as SAE 316L stainless steel.

Various modifications and/or improvements may be made to the above-described embodiments without departing from the scope of the invention as defined by the appended claims. In particular, while the use of a bearing element exhibiting a substantially spherical outer surface is particularly preferred, other solutions could possibly be contemplated. For instance, the outlet ports 10A, 10B could each be formed on eccentric bearings to allow adjustment of the angle of each jet.

One will also understand that, while it is preferable that each outlet port be formed on a corresponding adjustable positioning element, one outlet port could be fixed while the other is formed on an adjustable positioning element.

LIST OF REFERENCE NUMERALS AND SIGNS USED THEREIN 1 nozzle head
10A (first) outlet port
10B (second) outlet port
11 (first) casing member
12 (second) casing member
20A (first) bearing element (part of adjustable positioning element 20A/25A)
20B (second) bearing element (part of adjustable positioning element 20B/25B)
25A (first) nozzle element (part of adjustable positioning element 20A/25A)
25a orifice of nozzle element 25A
25B (second) nozzle element ((part of adjustable positioning element 20B/25B)
25b orifice of nozzle element 25B
30 supporting member
30A (first) bore in supporting member 30 configured to receive and hold adjustable positioning element 20A/25A
30B (second) bore in supporting member 30 configured to receive and hold adjustable positioning element 20B/25B
31A, 32A (first) pair of washers positioned on opposing sides of adjustable positioning element 20A/25A
31B, 32B (second) pair washers positioned on opposing sides of adjustable positioning element 20B/25B
200a spherical outer surface of bearing element 20A, 20B
200b recess formed in bearing element 20A, 20B and dimensioned to receive nozzle element 25A, 25B
200c shoulder portion of bearing element 20A, 20B supporting nozzle element 25A, 25B
200d outlet aperture formed in bearing element 20A, 20B
1000 surgical instrument
$J_A$ (first) jet of pressurized fluid produced by outlet port 10A
$J_B$ (second) jet of pressurized fluid produced by outlet port 10B
C point of convergence of jets $J_A$, $J_B$

The invention claimed is:

1. A nozzle head configured to produce at least two jets of pressurized fluid converging to a common convergence point, the nozzle head comprising a casing housing at least two outlet ports each configured to produce a corresponding one of the jets of pressurized fluid,
    wherein at least one of the outlet ports is formed on an adjustable positioning element housed within the casing and whose position can be adjusted to control an angle of the resulting jet of pressurized fluid and thus allow adjustment of a position of the convergence point,
    and wherein each adjustable positioning element comprises a bearing element exhibiting a substantially spherical outer surface.

2. The nozzle head according to claim 1, wherein each outlet port is formed on a corresponding adjustable positioning element.

3. The nozzle head according to claim 1, wherein each bearing element is received within a corresponding bore of a supporting member housed within the casing of the nozzle head and wherein each bearing element is held by friction within the bore.

4. The nozzle head according to claim 3, wherein the nozzle head is designed to take a first, adjustable configuration, in which each bearing element can be moved with respect to the supporting member to perform adjustment of the angle of the jet of pressurized fluid, and a second, locked configuration, in which each bearing element is locked in place and cannot move with respect to the supporting member.

5. The nozzle head according to claim 4, wherein the casing comprises first and second casing members,
    wherein, in the first, adjustable configuration, the first and second casing members are spaced one from the other to allow movement of each bearing element with respect to the supporting member,
    and wherein, in the second, locked configuration, the first and second casing members are pressed one onto the other or otherwise immobilized to prevent movement of each bearing element with respect to the supporting member.

6. The nozzle head according to claim 5, wherein each bearing element is located between a pair of washers located within the casing,
    and wherein, in the second, locked configuration, the first and second casing members cause the pair of washers to press against each bearing element and prevent movement thereof with respect to the supporting member.

7. The nozzle head according to claim 1, wherein each outlet port comprises a nozzle element provided with an orifice configured to produce a corresponding one of the jets of pressurized fluid.

8. The nozzle head according to claim 7, wherein a diameter of each orifice is comprised between 0.01 mm and 1.5 mm.

9. The nozzle head according to claim 7, wherein a distance between the common convergence point and each orifice is comprised between 10 mm and 120 mm.

10. The nozzle head according to any one of claim 7, wherein each nozzle element forms part of a corresponding adjustable positioning element and is received within a recess and supported by a shoulder portion of the adjustable positioning element.

11. The nozzle head according to claim 7, wherein each nozzle element consists of an orifice-forming element made of a hard material.

12. The nozzle head according to claim 11, wherein the hard material is sapphire, ruby or diamond.

13. The nozzle head according to claim 11, wherein the hard material is a hard metal.

14. The nozzle head according to claim 13, wherein the hard metal is steel.

15. The nozzle head according to claim 11, wherein the hard material is a ceramic material.

16. The nozzle head according to claim 15, wherein the ceramic material is tungsten carbide.

17. An apparatus comprising a nozzle head in accordance with claim 1 coupled to a source of pressurized fluid.

18. The apparatus according to claim 17, wherein each jet of pressurized fluid is produced at a pressure exceeding 50 bar.

19. The apparatus according to claim 17, wherein the apparatus is a surgical instrument used for cutting and/or dissecting biological tissue.

\* \* \* \* \*